United States Patent
Hirao et al.

(10) Patent No.: US 9,022,893 B2
(45) Date of Patent: May 5, 2015

(54) HYPOID GEAR SET FOR DRIVE AXLE

(71) Applicant: ArvinMeritor Technology, LLC, Troy, MI (US)

(72) Inventors: Wagner Yukio Hirao, Troy, MI (US); I-Chao Chung, Troy, MI (US); Tomaz Dopico Varela, Shelby Township, MI (US); Silvio M. Yamada, Waterford, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 13/677,572

(22) Filed: Nov. 15, 2012

(65) Prior Publication Data
US 2013/0074625 A1    Mar. 28, 2013

Related U.S. Application Data

(63) Continuation of application No. 12/841,243, filed on Jul. 22, 2010, now abandoned.

(51) Int. Cl.
| | |
|---|---|
| *F16H 48/08* | (2006.01) |
| *F16H 3/68* | (2006.01) |
| *F16H 1/18* | (2006.01) |
| *F16H 1/14* | (2006.01) |
| *F16H 57/02* | (2012.01) |

(52) U.S. Cl.
CPC ............... *F16H 1/18* (2013.01); *F16H 1/145* (2013.01); *F16H 57/02* (2013.01)

(58) Field of Classification Search
CPC ........... F16H 1/18; F16H 1/145; F16H 57/02; F16H 1/2054; F16H 1/30; F16H 3/68
USPC ......... 475/230, 331, 344; 74/423, 424.5, 457, 74/459.5
See application file for complete search history.

(56) References Cited

U.S. PATENT DOCUMENTS

| | | | | |
|---|---|---|---|---|
| 2,896,467 | A | * | 7/1959 | Saari ........................... 74/459.5 |
| 2,973,660 | A | * | 3/1961 | Popper ......................... 74/424.5 |
| 3,679,016 | A | | 7/1972 | Bixby |
| 4,095,675 | A | | 6/1978 | Bell |
| 4,207,780 | A | | 6/1980 | Saxton |
| 4,651,587 | A | * | 3/1987 | Anderson et al. ............ 74/459.5 |
| 4,733,578 | A | * | 3/1988 | Glaze et al. ................... 475/246 |
| 6,569,053 | B2 | | 5/2003 | Hirao et al. |
| 6,648,788 | B1 | | 11/2003 | Sullivan |
| 6,705,965 | B2 | | 3/2004 | Sullivan |
| 6,855,087 | B2 | * | 2/2005 | Chakraborty ................. 475/230 |
| 6,949,046 | B2 | | 9/2005 | Bell |

(Continued)

OTHER PUBLICATIONS

"Calculating Instructions for the Gleason No. 70 Hypoid Generator," retrieved from http://millfam.org, pp. 3 and 31.*

(Continued)

*Primary Examiner* — Justin Holmes
*Assistant Examiner* — Stacey Fluhart
(74) *Attorney, Agent, or Firm* — Brooks Kushman P.C.

(57) ABSTRACT

A hypoid gear set for a vehicle drivetrain includes a pinion gear in meshing engagement with a ring gear. The hypoid gear set has a negative pinion offset. The hypoid pinion and ring gears provide a predetermined gear ratio that can be varied up to a fifty percent faster ratio within a single carrier packaging envelope defined by a maximum ring gear diameter.

9 Claims, 3 Drawing Sheets

(56) References Cited

U.S. PATENT DOCUMENTS

| | | | |
|---|---|---|---|
| 6,991,571 B2 | 1/2006 | Gady et al. | |
| 7,866,433 B2 | 1/2011 | Martin, III et al. | |
| 2005/0202921 A1* | 9/2005 | Gangopadhyay et al. | 475/230 |
| 2006/0048856 A1 | 3/2006 | Li et al. | |
| 2006/0189431 A1* | 8/2006 | Selva et al. | 475/198 |
| 2006/0276292 A1 | 12/2006 | Puiu | |
| 2009/0277298 A1 | 11/2009 | Mayr | |

OTHER PUBLICATIONS

Website disclosing specifications for a gear including inner and outer diameters, retrieved from http://servocity.com, dated Jan. 15, 2010.*
"Design Manual for Bevel Gears," American National Standard, ANSI/AGMA 2005-096, Revision of ANSI/AGMA 2005-B88.
"Calculating Instructions for the Gleason No. 70 Hypoid Generator," http://millfam.org/terry/1,Hypoid_Calculation_instructions.pdf—site properties: created Dec. 29, 2008/ modified Jan. 2, 2009.

* cited by examiner

HYPOID GEAR SET FOR DRIVE AXLE

CROSS-REFERENCE TO RELATED APPLICATION

This application is a continuation of U.S. patent application Ser. No. 12/841,243, filed Jul. 22, 2010.

TECHNICAL FIELD

The subject invention relates to a hypoid ring and pinion gear set for commercial and off-highway vehicles that can achieve a large range of gear ratios within a single carrier packaging space.

BACKGROUND OF THE INVENTION

A single reduction drive axle includes a carrier with a pinion gear in meshing engagement with a ring gear. The pinion gear receives driving input from a vehicle driveshaft and the ring gear is configured to drive a differential gear assembly, which drives axle shafts to rotate laterally spaced wheels. Vehicle applications with single reduction axles include carrier configurations with spiral bevel gears or hypoid gears that can accommodate gear ratios of 7:1 to 2.5:1. Spiral bevel gears can achieve gear ratios as fast as 1:1; however, hypoid gears traditionally have not been able to achieve these faster ratios.

For commercial and off-highway vehicles with double reduction axles, planetary gear sets are included at laterally spaced wheel ends and are used in combination with a hypoid ring and pinion input gear set. The additional hub reduction may require the carrier to have faster ratios which cannot be achieved with current hypoid gear carrier configurations. In order to achieve these faster gear ratios, i.e. less than 2.5:1, the pinion size would become so large that it would be very difficult, if not impossible, to package the ring and pinion gear set within existing carriers.

SUMMARY OF THE INVENTION

A hypoid gear set for a vehicle drivetrain includes a pinion gear in meshing engagement with a ring gear. The ring and pinion gear provide a predetermined gear ratio that can be increased up to fifty percent faster within a single carrier packaging envelope that is defined by a maximum ring gear diameter.

In one example, the pinion and ring gears mesh with each other to provide a gear ratio range of 1.3:1 to 7.0:1 within the single carrier packaging envelope.

In one configuration, the single carrier packaging envelope is no larger than an amount of space required to package a hypoid gear set having a maximum ring gear diameter of 600 mm.

In one example, the hypoid gear set has a negative pinion offset.

These and other features of the present invention can be best understood from the following specification and drawings, the following of which is a brief description.

DETAILED DESCRIPTION OF THE PREFERRED EMBODIMENT

Figure 1:
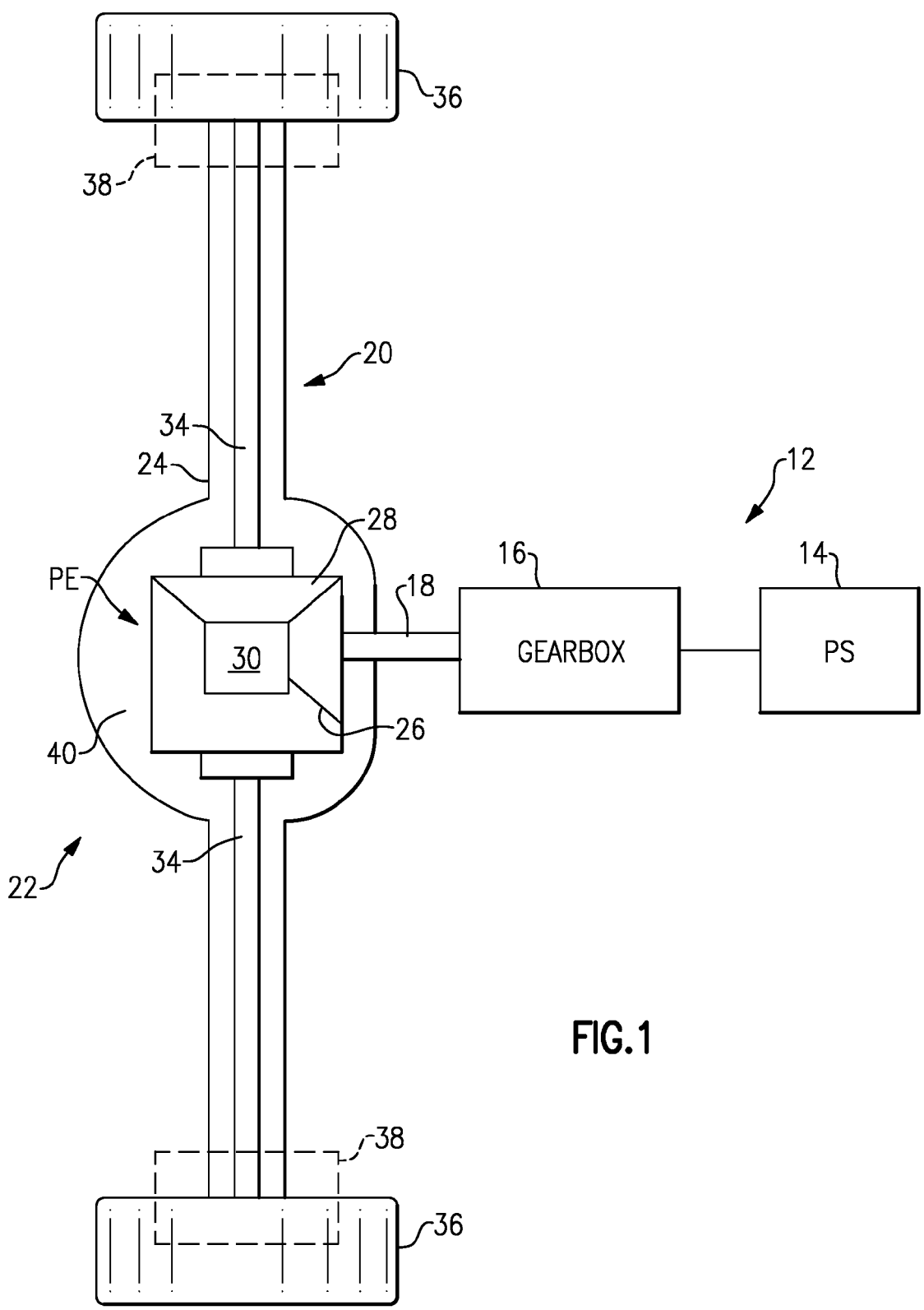
FIG. 1 comprises a schematic top view of a drive axle for a commercial vehicle that incorporates the subject invention.

As shown in FIG. 1, a vehicle drivetrain 12 includes a power source 14, gearbox 16, and drive shaft 18 that is coupled to a drive axle 20. The power source 14 can comprise an engine or electric motor, for example. The gearbox 16 can comprise any combination of the following: for example, a main transmission, auxiliary transmission, drop box, transfer case, etc. Optionally, the gearbox 16 may not be required for the drivetrain 12.

The drive axle 20 of FIG. 1 comprises a single reduction axle that includes a carrier assembly 22 positioned within an axle housing 24 as known. The carrier assembly 22 includes a hypoid pinion gear 26, operably coupled to the drive shaft 18, and which is in driving engagement with a hypoid ring gear 28. The carrier also includes a differential gear assembly 30 which is driven by the ring gear 28, and drives a pair of axle shafts 34 that drive laterally spaced vehicle wheels 36. Optionally, the drive axle 20 could comprise a double reduction axle, which would include an additional planetary gear set 38 (shown in dashed lines in FIG. 1) at each wheel end.

The carrier has a carrier housing portion that defines an internal cavity 40, which receives the hypoid pinion gear 26, hypoid ring gear 28, and differential gear assembly 30. The internal cavity 40 defines a maximum allowable packaging envelope PE to receive these components. In order to reduce weight and prevent interferences with vehicle frame and suspension components, it is important to minimize the size of the axle housing, and in turn the carrier housing portion. However, the internal cavity must be able to accommodate a gear set that can provide the desired range of gear ratios. This will be discussed in greater detail below.

In one example, the drivetrain 12 is utilized in a commercial vehicle application. Commercial vehicles are used for transporting products for business or commercial purposes and include vehicles such as delivery trucks, tractor-trailers, and eighteen-wheelers, for example. The drivetrain 12 could also be used in off-highway vehicle applications such as loaders, lifters, skidders, etc.

Traditional hypoid gear designs for the ring and pinion gear include either a left hand spiral pinion gear meshing with a right hand spiral ring gear in a pinion below center configuration, or a right hand spiral pinion gear meshing with a left had spiral ring gear in a pinion above center configuration. These traditional configurations are shown in FIGS. 2A and 3A.

Figure 2A:
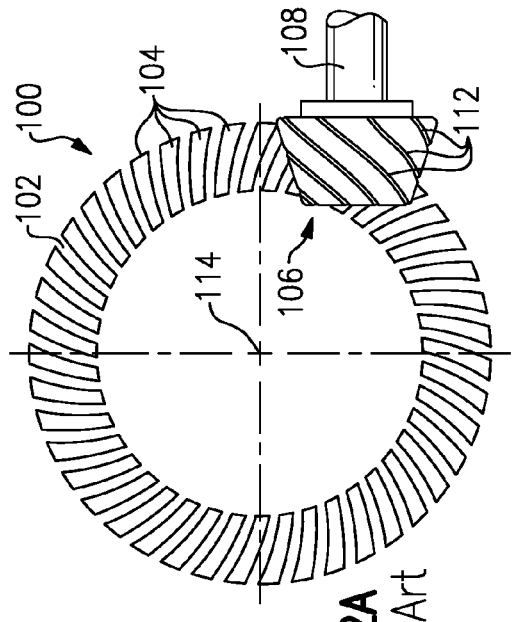
FIGS. 2A-2B comprise a front view of a prior art configuration with a left hand spiral pinion gear.
Figure 3A:
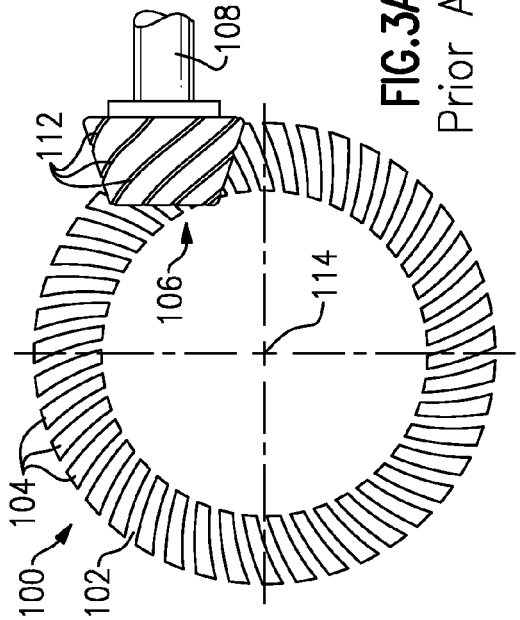
FIGS. 3A-3B comprise a front view of a prior art configuration with a right hand spiral pinion gear.
Figure 2B:
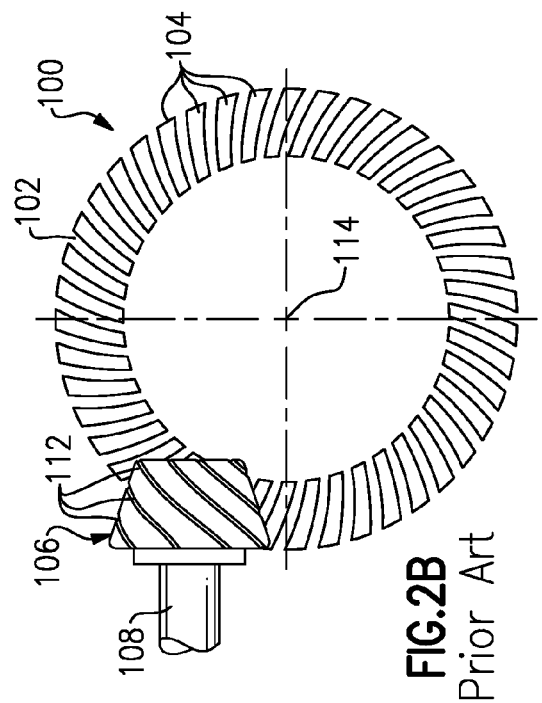

FIGS. 2A-2B show a traditional hypoid ring gear 100 having a front face 102 with a plurality of ring gear teeth 104. A hypoid pinion gear 106 includes a pinion shaft 108 and a plurality of pinion gear teeth 112. Convention for determining whether the gear set is a pinion above center configuration or a pinion below center configuration requires that, when facing the front face 102 of the ring gear 100, the pinion 106 is positioned at the right hand side of the ring gear 100 to mesh with the ring gear teeth 104. This configuration is shown in FIGS. 2A and 3A. In FIG. 2A the pinion gear 106 is defined as being below a ring gear center horizontal axis 114 and in FIG. 3A the pinion gear 106 is defined as being above the ring gear center horizontal axis 114.

In FIG. 2A, the pinion gear 106 has a left hand spiral and the ring gear 100 has a right hand spiral. In FIG. 3A, the pinion gear 106 has a right hand spiral and the ring gear 100 has a left hand spiral. In this standard convention, left hand spiral pinion gears are always positioned below a center of the mating ring gear and right hand spiral pinion gears are always positioned above a center of the mating ring gear. These conventional configurations provide the desired strength, noise, and ratio characteristics required for commercial vehicle applications.

Figure 3B:
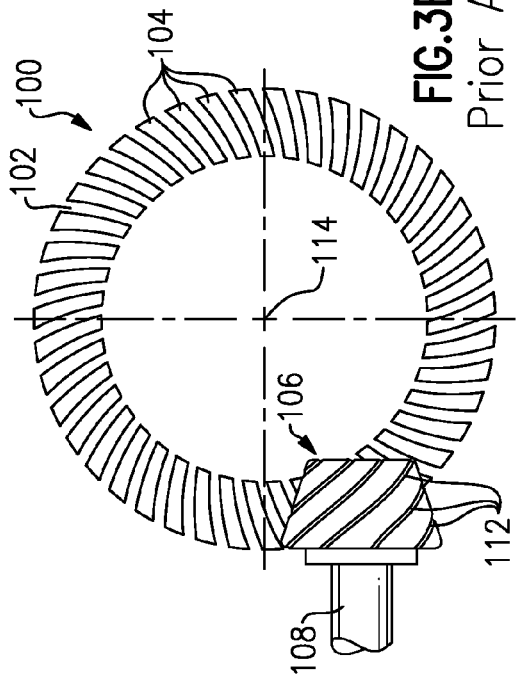

FIG. 2B is the configuration of FIG. 2A rotated 180 degrees about ring gear axis 114. Similarly, FIG. 3B is the configuration of 3A rotated 180 degrees about ring gear axis 114.

Traditionally, drive axles with hypoid ring and pinion gear sets for commercial vehicle applications have gear ratios in the range of 2.5:1 to 7:1. When hub reductions are used, such as those used in double reduction axles with planetary gear sets 38 at the wheel ends, faster gear ratios may needed for high speed applications. Hypoid gear ratios faster than 2.5:1 are very difficult, if not impossible, to package within the current carrier configurations.

Figure 4:
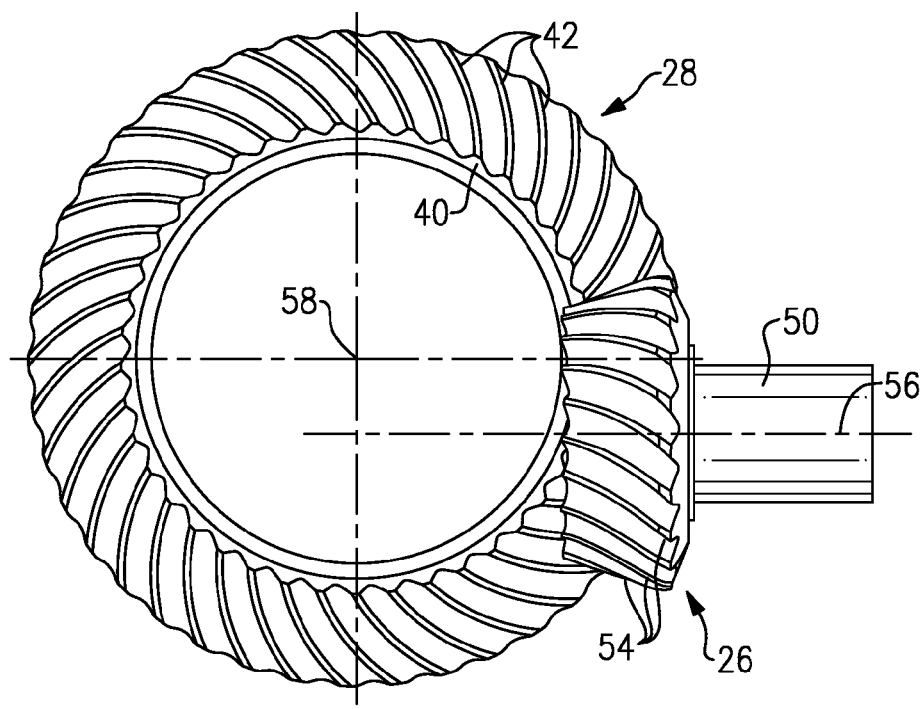
FIG. 4 comprises a front view of a ring and pinion gear set incorporating the subject invention with a right-hand spiral pinion gear below center configuration.
Figure 5:
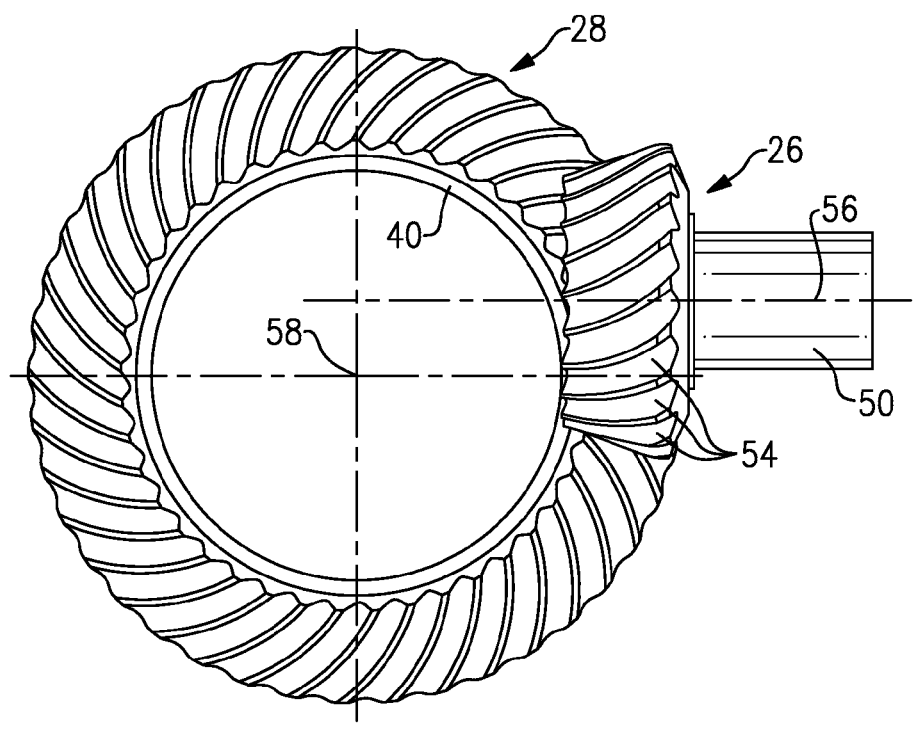
FIG. 5 comprises a front view of a ring and pinion gear set incorporating the subject invention with a left-hand spiral pinion gear above center configuration.

The subject hyoid ring gear 28 and pinion gear 26, shown in FIGS. 4 and 5, are uniquely configured to achieve gear ratios below the typical 2.5:1 ratio, thus extending the overall ratio range to 1.3:1 to 7.0:1 in one single packaging envelope for a drive axle 20 as used in commercial vehicle applications. The drive axle 20 can comprise either a single reduction drive axle or a double reduction axle. This offers a significant competitive advantage over prior designs as the hypoid gear set provides faster gear ratios without having to increase carrier size. This is advantageous from cost, weight, and packaging perspectives. The hypoid gear set is uniquely configured such that a wider range of ratios can be packaged within a single maximum carrier packaging envelope. This packaging envelope is defined as being no larger than an amount of space required to package a differential and a hypoid gear set having a maximum ring gear diameter of 600 mm. In this configuration the hypoid gear set has a predetermined gear ratio that can be varied up to a fifty percent faster ratio all within this single maximum packaging enveloped defined by the maximum ring gear diameter of 600 mm. This will be discussed in greater detail below.

As shown in FIGS. 4 and 5, the hypoid gear set is able to provide this wider range of ratios by utilizing a negative pinion offset configuration. In a negative pinion offset configuration, the pinion gear has a smaller spiral angle than the spiral angle of the ring gear. Conversely, in a positive offset configuration, the pinion gear has a greater spiral angle than the spiral angle of the ring gear. To faster ratios with hypoid gears, i.e. ratios faster than 2.5:1, the hypoid gear set has a negative pinion offset. Negative pinion offset can have offset below the gear center axis with a right spiral pinion (FIG. 4), or an offset above center with a left hand spiral pinion (FIG. 5).

As shown in FIGS. 4 and 5, the ring gear 28 includes a front face 40 having a plurality of ring gear teeth 42. The pinion gear 26 includes a pinion shaft 50 and a plurality of pinion gear teeth 54. Using standard conventions, the pinion gear 26 is positioned at the right side of the front face 40 with the pinion teeth 54 in meshing engagement with the ring gear teeth 42. The pinion shaft 50 extends off to the right to be coupled to the driveshaft 18.

FIG. 4 shows a configuration where a pinion gear axis 56 is offset below a ring gear axis 58. In this configuration, the pinion gear 26 has a right hand spiral and the ring gear 28 has a left hand spiral. When compared to a conventional hypoid gear set with the left hand spiral pinion being offset below the ring gear axis (FIG. 2A), the configuration shown in FIG. 4 can achieve faster gear ratios because the pinion gear head size decreases as result of the negative pinion offset configuration.

As known, gear ratio is the ratio between the number of teeth in the ring gear and pinion gear. In traditional configurations with positive pinion offset, pinion gear head size increases as offset increases and ratios only as fast as 2.5:1 can be achieved. When a negative pinion offset relative to a gear center 58 is utilized, pinion gear head size decreases as offset increases. This allows pinion gear head size to be minimized within a single packaging envelope in order to achieve the desired faster ratios.

Thus, for a hypoid ring gear having a set pitch diameter, a faster gear ratio can be achieved by utilizing a negative pinion offset. For example, for a ring gear having a pitch diameter of 381 mm and a left hand spiral pinion offset below center with (traditional configuration as shown in FIG. 2A), a gear ratio of 2.47:1 can be achieved with a pinion outside diameter being 222 mm. Using the same ring gear pitch diameter and same pinion offset amount with a negative value (right hand spiral pinion below center), a gear ratio of 1.86:1 can be achieved with a much smaller pinion gear (outside diameter of 188 mm). Further, ring gear spiral angles, pinion gear spiral angles, and other tooth design parameters can be varied/adjusted as needed to maintain desired contact ratios, durability, and strength requirements. This provides approximately the same desired level of quietness for a faster ratio as would be achieved with the comparable traditional configuration having a higher gear ratio.

As discussed above, the negative pinion offset configurations are especially beneficial for commercial vehicle applications which have low input speeds typical in modern engines. For these types of applications, the subject negative pinion offset configurations are utilized with a minimum ring gear diameter of 100 mm for double reduction axles and a minimum ring gear diameter of 300 mm for single reduction axles. The maximum ring gear diameter would be approximately 600 mm.

Further, the amount of pinion offset is determined based on the type of axle and commercial application. In the negative pinion offset configurations, offset is within the range of 25-55 mm from a gear centerline. Pinion offset is chosen based on strength reasons for a given type of axle and application. In initial design stages for a carrier, various pinion offsets are studied to determine how wide the range of gear ratios can be within a specified packaging space, which still meets the desired strength and noise requirements. With the subject negative pinion offset configurations, the gear ratio offering can be increased significantly toward faster ratios not previously achievable, and all within a single traditional sized packing envelope. Once offset is established for the given type of axle, it is preferred to remain unchanged as subsequently changing offset would require new carrier castings. With the negative pinion offset configuration, faster ratios can be provided within this same casting.

FIG. 5 also shows a negative offset configuration wherein the left hand spiral pinion has an offset above the gear center axis 58.

The hypoid gear design uses hypoid ring and pinion gears with a certain combination of pinion offset, pinion spiral hand, and other gear parameters to allow gear ratios to be 50% faster within a traditional existing axle housing envelope. In general, negative pinion offset is never utilized due to concerns regarding noise and durability.

The subject hypoid gears with negative pinion offset avoid these potential concerns by providing a ring gear spiral angel within a range of 30 to 50 degrees in combination with other tooth design parameters. For example, the hypoid gear set has tooth design parameters set to achieve a profile tooth contact ratio between 1.0 and 1.4 and to achieve a tooth face contact ratio between 1.1 and 1.5. Tooth design parameters are tooth combination, ring gear pitch diameter, pinion offset, face width, pressure angle, whole depth, etc.

The resulting negative pinion offset configuration, in combination with the gear parameters discussed above, allows the new gear configuration with faster available ratios to be installed within existing axle housings as well as allowing existing ring gear and pinion forgings to be used. The new configuration also retains approximately the same gear strength of the slower gear ratios using traditional configurations.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle axle comprising:
   a hypoid pinion gear having a first number of spiral gear teeth and an outer diameter; and
   a hypoid ring gear having a pinion gear engagement side with a second number of spiral gear teeth and a pitch diameter wherein the spiral gear teeth of the ring gear are in meshing engagement with the spiral gear teeth of the pinion gear, wherein a ratio of the pitch diameter to the outer diameter is greater than a ratio of the second number to the first number, and
   wherein when viewing the pinion gear engagement side of the ring gear with the pinion gear to the right of a ring gear vertical axis, the pinion gear engages the ring gear in a manner selected from the group consisting of:
   (a) the pinion gear is offset below a horizontal axis of the ring gear and the pinion gear spiral gear teeth are right-handed; and
   (b) the pinion gear is offset above the horizontal axis of the ring gear and the pinion gear spiral gear teeth are left-handed.

2. The axle of claim 1, wherein the pinion gear spiral gear teeth are right-handed and the ring gear spiral gear teeth are left-handed.

3. The axle of claim 1, wherein the pinion gear spiral gear teeth are left-handed and the ring gear spiral gear teeth are right-handed.

4. The axle of claim 1, wherein the pitch diameter is in a range of 100 mm to 600 mm.

5. The axle of claim 1, wherein the ring gear teeth have a spiral angle between 30 and 50 degrees.

6. The axle of claim 1, further comprising a carrier housing, wherein the ring gear is disposed within the carrier housing.

7. The axle of claim 1, wherein the axle is a commercial vehicle axle.

8. The axle of claim 1, wherein the axle is an off-highway vehicle axle.

9. The axle of claim 1, further comprising an axle housing and a carrier housing.

* * * * *